United States Patent [19]
Edmonson et al.

[11] 4,167,221
[45] Sep. 11, 1979

[54] POWER EQUIPMENT STARTING SYSTEM

[75] Inventors: Orvan D. Edmonson, Apple Valley; William D. Wood, Minneapolis, both of Minn.

[73] Assignee: The Toro Company, Minneapolis, Minn.

[21] Appl. No.: 711,252

[22] Filed: Aug. 3, 1976

[51] Int. Cl.² ............................................. B62D 51/04
[52] U.S. Cl. ................................. 180/19 H; 56/10.2; 180/273; 200/157
[58] Field of Search ..................... 56/10.2, 11.3, 10.5; 200/157, 318, 321, 322, 61.85; 123/198 DC; 180/99, 19 H; 74/2, 488, 489

[56] References Cited

U.S. PATENT DOCUMENTS

| | | | |
|---|---|---|---|
| 2,298,135 | 10/1942 | Klein | 56/10.5 |
| 3,142,950 | 8/1964 | West | 56/25.4 |
| 3,398,250 | 8/1968 | Bowers | 200/157 |
| 3,603,065 | 9/1971 | Weber | 56/10.5 |
| 3,667,199 | 6/1972 | Bloom | 56/320.2 |
| 3,841,069 | 10/1974 | Weck | 56/10.5 |
| 3,849,620 | 10/1974 | Melisz | 200/157 |
| 4,044,532 | 8/1977 | Lessig | 56/10.5 |

FOREIGN PATENT DOCUMENTS 289396  10/1928  United Kingdom .................... 200/157

Primary Examiner—Harold J. Tudor
Attorney, Agent, or Firm—Merchant, Gould, Smith, Edell, Welter & Schmidt

[57] ABSTRACT

A starting interlock system for power equipment having a cam rotatable between two positions corresponding to energization modes of the equipment and a lever for holding the cam in each position. The cam has two cam surfaces, each of which is engaged by a separate one of two contact surfaces on the lever. The cam is pivotally mounted in a housing on the power equipment operator handle and the housing has an opening for insertion of a key into engagement with the cam to facilitate manual rotation of the cam. In a first energization mode, the lever must be continually manually held by the operator to retain the cam against rotation. Upon release of the lever, the cam pivots to a position corresponding to a second energization mode where it is locked against rotation until the lever is again manipulated by the operator. In the first energization mode, the key is retained within the housing, and cannot be removed. The cam is connected by a bowden wire cable to an electrical switch having two positions corresponding to the two energization modes. The switch is spring biased toward one of the energization modes. The biasing force is transferred from the switch, via the bowden wire cable to rotate the cam upon release of the manually held lever.

22 Claims, 5 Drawing Figures

POWER EQUIPMENT STARTING SYSTEM

BACKGROUND OF THE INVENTION

This invention relates to a starting interlock system for power equipment in general, and more particularly a starting interlock system for electric-powered lawn mowers.

It is desirable to have a starting system for power equipment that requires a deliberate attempt on the part of the equipment user to start the equipment.

It is desirable to lessen the probability of unauthorized starting of the equipment and additionally to provide a system which ceases to operate when the operator leaves the control handle. Inadvertent starting of the equipment should be difficult, particularly as the operator performs repair or maintenance functions on the equipment. It is also advantageous to have a system requiring positive operator effort to keep the power equipment running.

Prior art devices are known which do require not only a deliberate attempt to start power equipment, but also a concentrated effort to maintain the equipment running. Such devices may include an ignition switch operated by a key in conjunction with a dead man handle that must be continually manually depressed to maintain the equipment running. (One of such devices is shown in U.S. patent application Ser. No. 601,345, filed Aug. 4, 1975.) In the system disclosed in that application, a key operated ignition switch is mounted on a lawn mower handle in close proximity to the operator's hand grip. A squeeze handle must be continually depressed by the operator and upon release causes the equipment to turn off. Electrical wires lead from the switch housing on the handle to the motor mounted on the mower frame.

Problems arose in the use of prior art devices, particularly those having live electrical wires leading from the equipment handle to the equipment main frame. Shorts in these electrical wires could lead to equipment malfunctions. Additionally, the prior art devices included a relatively large number of parts both increasing the chances of malfunction and raising the cost of the device.

The present invention solves the problems of the prior art devices by providing a simple, low cost, easy to assemble starting interlock requiring the manipulation of a key lock and a dead man handle to permit energization. The electrical switch associated with the equipment motor is mounted on the frame housing and actuated by a bowden wire cable connected to a manual interlock device.

SUMMARY OF THE INVENTION

The present invention is a starting interlock system for power equipment and includes a cam pivotally mounted to the operator's handle for rotation between first and second cam positions and having first and second cam surfaces and apparatus responsive to the cam position for energizing the equipment when the cam is in the first cam position. The invention further includes a lever pivotally mounted to the operator handle for rotation between energization and release positions and having a first contact surface that in the energization position engages the first cam surface in the first cam position preventing the cam from rotating to the second cam position and a second contact surface that, in the release position, engages the second cam surface in the second cam position to lock the cam in the second cam position, and means biasing the cam toward the second cam position. Since the lever and the contact surfaces associated therewith merely maintain the cam in an already established position, the invention also includes means for permitting pivoting the cam against the biasing means to the first cam position, which may be an insertable key in some embodiments.

The lever must be continuously manually held in the energization position by the operator. The first cam surface is disposed relative to the pivot points of the cam and lever such that upon release of the lever, the contact and cam surfaces disengage allowing the lever to rotate to the release position under the influence of gravitation pull while the cam rotates to the second cam position.

In one specific embodiment of the present invention, the cam is mounted in a housing having an opening through which a removable key is inserted to rotate the cam from the second to the first cam position. The opening in the housing has an enlarged portion and an elongated slot extending therefrom. An annular disc disposed about a cylindrical projection on the key has a diameter smaller than the enlarged portion of the opening but larger than the width of the elongated slot. Thus the key, upon rotation of the cam to the first cam position, is retained by the elongated slot and cannot be removed.

Finally, in one embodiment, the apparatus responsive to cam position to energize the equipment is an electrical switch connected to the cam by a bowden wire cable. The switch is spring biased toward a de-energized position corresponding to the second cam position. Upon rotation of the cam to the first cam position, the bowden wire exerts a force on the switch overcoming the biasing spring and turning the switch to the energization position.

The operation and advantages of the invention will be appreciated with reference to the drawings, detailed description of the preferred embodiment, and the claims.

DESCRIPTION OF THE PREFERRED EMBODIMENT

Figure 1:
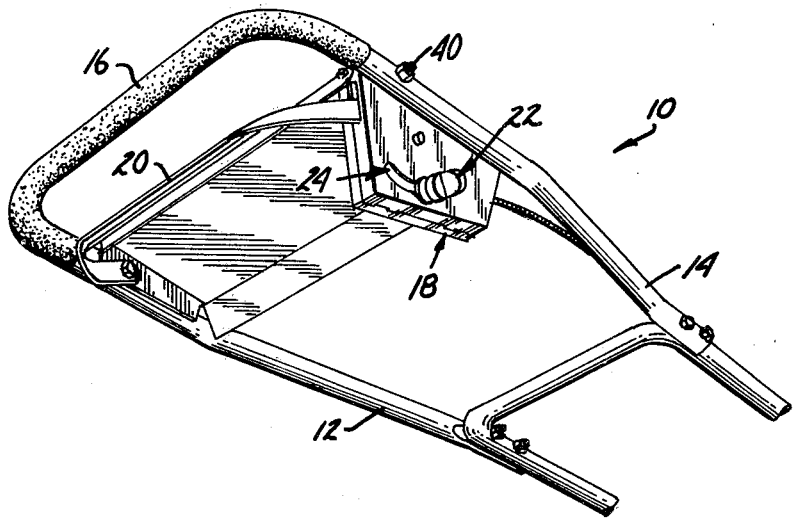
FIG. 1 is a fragmentary view in perspective of a power equipment handle incorporating the actuating mechanism for my new starting interlock system.

The following description will relate to an embodiment of the invention as it is applied to a lawn mower. Referring to the drawings, wherein like numerals represent like parts throughout the several views, there is shown in FIG. 1 designated generally as 10 an upper portion of a handle which is attached at its lower end to the frame of the lawn mower. The upper portion 10 is generally U-shaped having legs 12 and 14 and a connecting hand grip 16. Secured to leg 14 is an interlock device housing 18. Pivotally mounted within housing 18 and to opposite leg 12 is an implement dead man lever 20. The interlock device functions so that the equipment will run only while the dead man lever 20 is raised against the hand grip 16 as illustrated more specifically in FIG. 3. Additionally, the implement will run only upon rotation of a cam 26 into an energization position. This is permitted by insertion of a key 22 into an opening 24 in the housing 18 into contact with cam 26, and manual rotation of the cam by the key to energize the equipment. The specific operation of the key 22 and lever 20 interlock will be described more specifically with respect to FIGS. 2 and 3.

Figure 2:
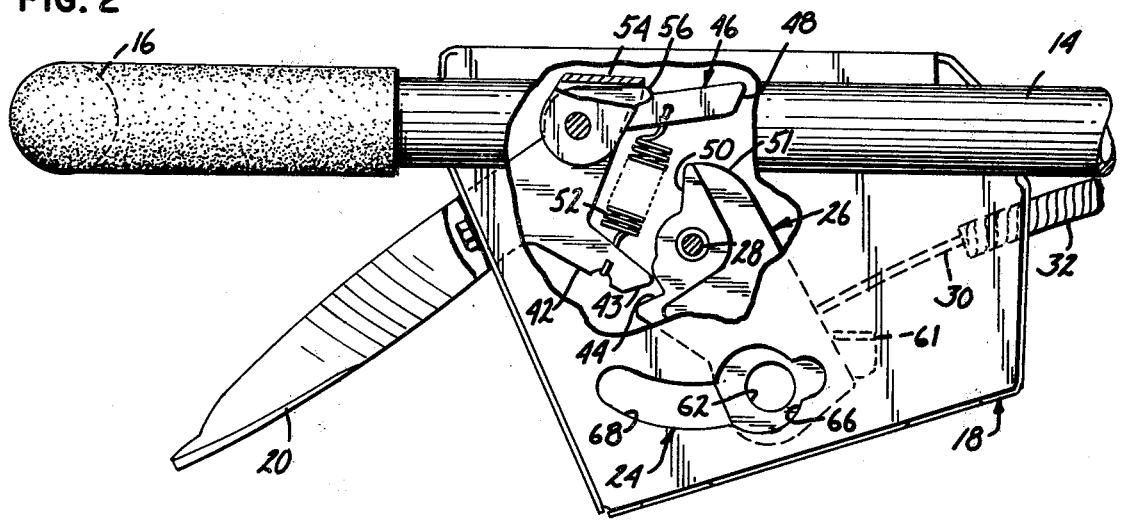
FIG. 2 is an elevational view of the actuating mechanism shown in FIG. 1, portions thereof being broken away to show the details of construction with the system components in a position which corresponds to a braking or deenergization mode of the equipment.
Figure 3:
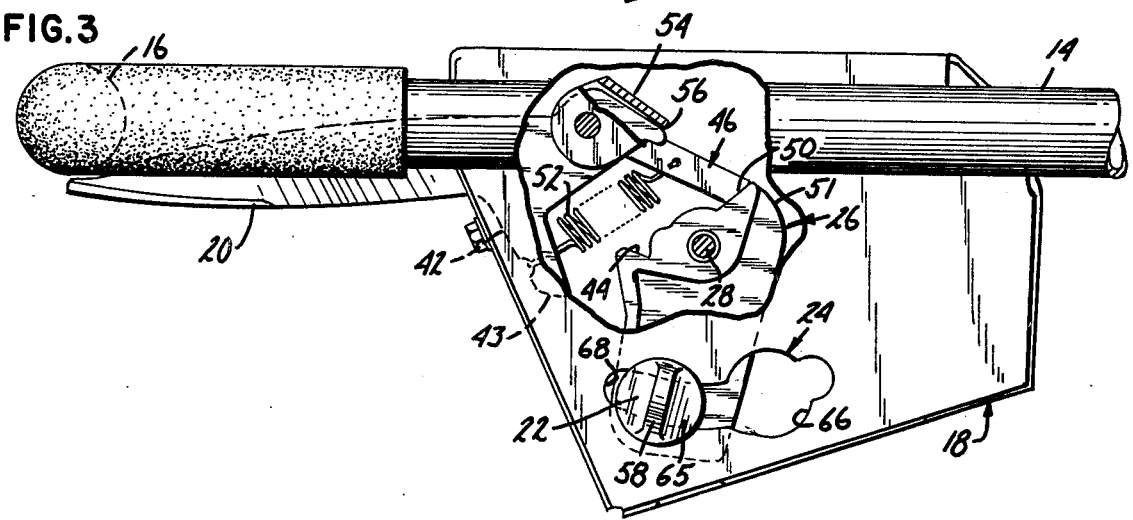
FIG. 3 is a view similar to that shown in FIG. 2 with the system components in a mode corresponding to an energization mode of the equipment.
Figure 4:
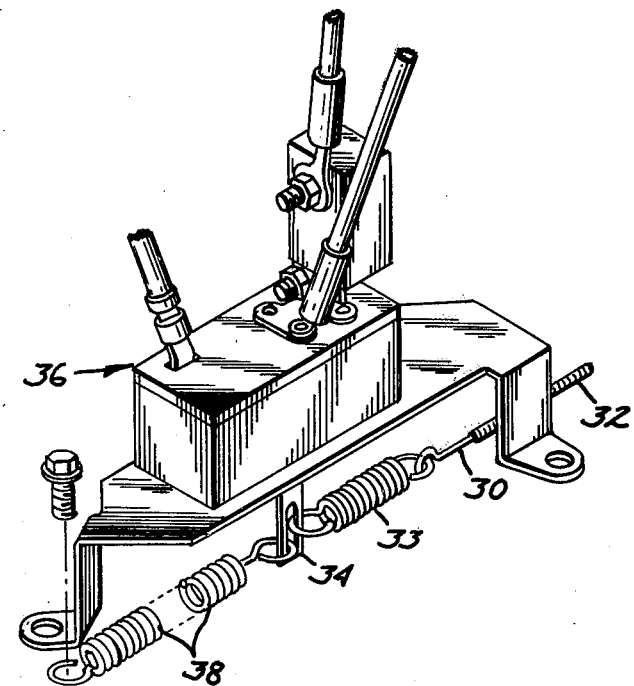
FIG. 4 is a view in perspective of an electrical switch operated by the actuating mechanism.

FIG. 2 illustrates the relation of the interlock device elements in the implement braking or deenergization mode. The device includes a cam 26 pivotally mounted within the housing on a shaft 28. Attached to the cam is a bowden wire control cable 30 which extends through a plastic tubing 32 along handle 10 to the mower frame. As shown in FIG. 4, the opposite end of the cable is attached, through a spring 33 which takes up cam overtravel, to an actuating member 34 of an electrical switch designated generally as 36. The switch may be a two-way switch having an energization and a braking or de-energization mode. Switch 36 is secured to the mower frame. A spring 38 biases switch 36 to a normally de-energization position. Rotation of cam 26 in a clockwise direction to the position shown in FIG. 3 exerts a force on cable 30, causing member 34 to move, against the bias of spring 38, to an energization position.

Dead man lever 20 is pivotally mounted to leg 14 of the U-shaped handle 10 and the housing 18 about a shaft member 40. Pivotally mounted to shaft 40 is an arm 46 having a first contact surface 48 which engages a first cam surface 50. The lever 20 has a projecting arm portion 42 with a second contact surface 43 that engages cam 26 at a second cam surface 44. Spring 52 is connected between the arms 42 and 46 and tensioned to urge the arms together. The arm 46 has a stop portion 54 which cooperates with a stop engaging member 56 on the handle 20 to maintain the arms a predetermined distance apart.

Figure 5:
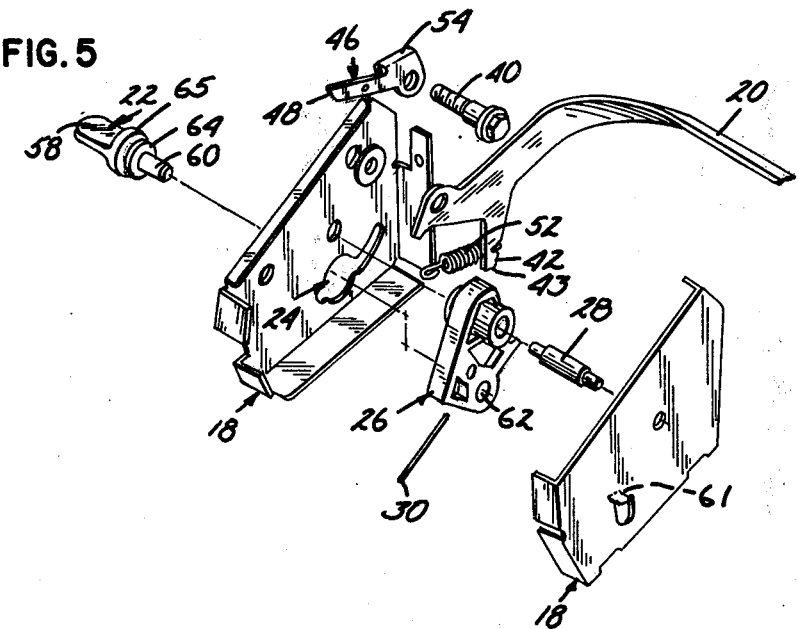
FIG. 5 is a view in exploded perspective of a portion of the actuating mechanism.

With particular reference to FIG. 5, the structure of the key 22 is more specifically illustrated. The key has a grasping portion 58 and a cylindrical projection 60 for insertion in an aperture 62 in cam 26. Integral with the cylindrical projection 60 is a first annular disc 64 having a diameter somewhat smaller than the largest portion 66 of the opening 24 in the housing 18. This sizing permits first annular disc 64 and portions of projection 60 which function as the working portion of the key to be positioned within the housing when the key 22 engages aperture 62 in cam 26. Extending from the opening 66 is an elongated slot 68 whose width dimension is smaller than the diameter of the annular disc 64. A second annular disc 65 is integral with the grasping portion 58 and has a diameter larger than the widest dimension of the elongated slot 68 and, as shown in FIG. 3, remains outside the housing when key 22 engages aperture 62 in cam 26. When the cam is rotated to the energization or first cam position by the key disc 64 is captivated by the housing, since its diameter is larger than the width of the elongated slot along which projection 60 rides. Thus, the key cannot be removed from the housing. A tab 61 contacts cam 26 in the second cam position to retain the cam in position against the spring biasing force of spring 38 in switch 36.

The operation of the device will now be described particularly with reference to FIGS. 2 and 3. FIG. 2 illustrates the relative positions of the device elements in the braking or de-energization mode. In this configuration, the surface 43 contacts the cam surface 44 on the cam 26 if an attempt to rotate cam 26 to an energization position is made. The force established between contact surface 43 and cam surface 44 has a component directed counterclockwise in a plane normal to the axes of shafts 40 and 28. Therefore, cam 26 cannot be manually rotated to the first cam position until level 20 is rotated to the energization position disengaging contact surface 43 from cam surface 44.

To energize the lawn mower, key 22 is inserted within the enlarged opening 66 and into the aperture 62 in the cam 26. Lever 20 is grasped by the operator and pulled toward the hand grip 16. As dead man lever 20 pivots toward hand grip 16, and arm 42 becomes disengaged from cam surface 44, arm 46 rotates clockwise into contact with top surface 51 of the cam. The operator then rotates cam 26 clockwise by moving the key along elongated slot 68. Arm 46 will ride on surface 51 until cam 26 is rotated sufficiently so that contact surface 48 of arm 46 drops into contact with cam surface 50. In the energization mode position illustrated in FIG. 3, arm 46 applies a retaining force to the cam preventing its counterclockwise rotation. Upon release of the lever 20, the lever will rotate counterclockwise due primarily to gravitational forces. The lever 46 will in response rotate upward, disengaging from surface 50 allowing cam 26 to return to the de-energized position shown in FIG. 2 under the biasing force of spring 38, transmitted by bowden wire cable 30 to cam 26. Spring 38 will return the electrical switch to the braking position.

The position of shafts 28 and 40 about which cam 26 and lever 20 rotate with respect to each other and to the orientation of the cam surface 50 is critical to the operation of the interlock device upon release of lever 20. More particularly, as shown in FIG. 3, cam surface 50 is disposed in a plane normal to the axes of shafts 28 and 40. In the energization position of the lever 20 the force exerted by cam surface 50 upon end surface 48 of the arm 46 transmitted by biasing spring 38 to the cam 26 has a component directed so that it acts upon contact surface 48 to impart pivotal movement to lever 20 in a counterclockwise direction. Thus upon release of lever 20, this outward force swings arm 46 counterclockwise out of engagement with cam 26 while lever 20 rotates downward under the influence of the gravitational pull. Thus it will be appreciated that the implement will operate only after pivotal movement of lever 20 against the hand grip 16, insertion of the key 22, and clockwise rotation of cam 26. Therefore, if the implement operator releases the lever, the implement will, in response, shift to a de-energize mode. Additionally, since the equipment cannot be started without the key 22, the possibility of unauthorized starting of the equipment is minimized.

As previously mentioned, spring 52 is tensioned to urge the arm 46 toward the arm 42. In the braking or de-energization mode shown in FIG. 2, stop 54 contacts stop engaging member 56 on handle 20 to maintain a predetermined distance between arms 42 and 46 to permit limited travel of the arm 46 before it comes into contact with the top surface 51 of the cam 26. Spring 52 facilitates ease of operation of lever 20 in that the operator may initially rotate the lever toward the energization position followed by rotation of the cam. Were the spring not included, the operations would necessarily have to be made substantially simultaneously.

Thus, it will be appreciated that the starting interlock disclosed is a mechanism which permits the starting and running of a mower or other equipment only upon deliberate control by the operator.

What we claim is:

1. A starting interlock system for power equipment having a main frame and an operator handle attached thereto, comprising:
   a cam having first and second cam surfaces;
   means pivotally mounting said cam to the operator handle for pivotal movement between first and second cam positions;
   means biasing said cam toward said second cam position;
   means for permitting pivoting said cam to said first cam position;
   a dead man lever pivotally mounted to the operator handle for rotation between energization and release positions, corresponding to said first and second cam positions, respectively, said lever having a first contact surface that, in the energization position, engages the first cam surface in said first position and prevents said cam from rotating to said second position, and having a second contact surface that, in the release position, engages the second cam surface in said second position to lock said cam in said second position; and
   means responsive to cam position for energizing the equipment when said cam is in said first position.

2. A starting interlock system in accordance with claim 1 wherein said first cam surface is disposed on said cam with respect to an axis about which said lever pivots so that force of said biasing means transferred by said first cam surface to said first contact surface on said lever is directed to pivot said lever toward said release position.

3. A starting interlock system in accordance with claim 2 wherein said means responsive to cam position further comprises:
   an electrical switch mounted on the main frame of the equipment and having first and second positions corresponding to said energization and said release positions of said lever, respectively;
   spring means biasing said switch to said second position; and
   a wire cable connecting said switch to said cam whereby rotation of said cam to said first cam position causes said switch to assume said first switch position.

4. A starting interlock system in accordance with claim 2 wherein said means for permitting pivoting said cam further comprises insertable key means for engaging said cam to facilitate manual rotation thereof.

5. A starting interlock system in accordance with claim 4 further comprising a housing mounted on the operator handle enclosing said cam and a portion of said lever, said housing having an opening formed therethrough to allow access to said cam to said key means.

6. A starting interlock system in accordance with claim 5 wherein said opening in said housing further comprises an enlarged aperture with an elongated arcuate slot extending therefrom, said elongated arcuate slot having elongation and non-elongation dimensions.

7. A starting interlock system in accordance with claim 6 wherein said key means further comprises:
   a grasping portion;
   cylindrical projection means extending from said grasping portion for engaging said cam; and
   a first annular disc, sized to permit passage through said enlarged aperture, disposed on said cylindrical projection means so that said disc is positioned within said housing when said key means engages said cam.

8. A starting interlock system in accordance with claim 7 wherein said first annular disc has a diameter greater than the non-elongation dimension of said elongated slot whereby said key means cannot be removed from said housing when said cam is in said first cam position.

9. A starting interlock system in accordance with claim 8 wherein said key further comprises a second annular disc disposed between said grasping member and said first annular disc and spaced from said first annular disc, said second annular disc having a diameter larger than the non-elongation dimension of said elongated slot whereby said key is retained by said housing upon rotation of said cam to said first cam position.

10. A starting interlock system in accordance with claim 1 wherein said lever further comprises:
    a manual operating arm;
    first arm means pivotally connected to said manual operating arm for defining said first contact surface; and
    second arm means extending from said operating arm for defining said second contact surface.

11. A starting interlock system in accordance with claim 10 further comprising:
    spring means connected to said first and second arm means for urging said arms together;
    a stop portion on said first arm means; and
    stop engaging means on said operating arm for contacting said stop portion to maintain said first and second arm means a predetermined minimum distance apart against the spring biasing force.

12. A starting interlock system for power equipment having a main frame and an operator handle attached thereto, comprising:
    a housing mounted on the operator handle and having an opening therein;
    a cam, having first and second cam surfaces, pivotally mounted within said housing and rotatable between first and second cam positions;
    means for biasing said cam toward said second cam position;
    removable key means for insertion through said opening in said housing into contact with said cam to allow manual rotation of said cam between said first and second positions by means of manual force applied to said key means;
    a dead man lever pivotally mounted to the operator handle for rotation between energization and release positions and having a first contact surface that, in the energization position, engages said first cam surface to hold said cam in said first cam position, and a second contact surface that, in the release position, engages said second cam surface to hold said cam in said second cam position; and
    means responsive to cam position for controlling the energization of the equipment.

13. A starting interlock system in accordance with claim 12 wherein said first cam surface is disposed on said cam with respect to a point about which said lever pivots so that force of said biasing means transferred by said first cam surface to said first contact surface on said lever is directed to pivot said lever toward said release position.

14. In combination with an electric powered lawn mower having a frame on which an electric motor is mounted, an operator handle attached to the frame, a two-way switch mounted on the frame and having first and second positions corresponding to energization and deenergization modes of the electric motor; a starting interlock system, comprising:
a cam having first and second cam surfaces;
means for pivotally mounting said cam to the operator handle for pivotal movement between first and second cam positions;
means biasing said cam to said second cam position;
means for permitting pivoting said cam to said first cam position;
a dead man lever pivotally mounted to the operator handle for rotation between energization and release positions and having a first contact surface that, in the energization position, engages said first cam surface to hold said cam in said first cam position and a second contact surface that, in the release position, engages said second cam surface to hold said cam in said second cam position; and
means connecting said cam to the two-way switch for controlling the mode of the electric motor in response to cam position.

15. A starting interlock system in accordance with claim 14 wherein said first cam surface is disposed on said cam with respect to a point about which said lever pivots so that force of said biasing means transferred by said first cam surface to said first contact surface on said lever is directed to pivot said lever toward said release position.

16. A starting interlock system in accordance with claim 15 wherein said means for permitting pivoting said cam further comprises insertable key means for engaging said cam to facilitate manual rotation thereof.

17. A starting interlock system in accordance with claim 16 further comprising a housing mounted on the operator handle enclosing said cam and a portion of said lever, said housing having an opening formed therethrough to allow access to said cam to said key means.

18. A starting interlock system in accordance with claim 17 wherein said opening in said housing further comprises an enlarged aperture and an elongated arcuate slot extending therefrom, said elongated arcuate slot having elongation and non-elongation dimensions.

19. A starting interlock system in accordance with claim 18 wherein said key means further comprises:
a grasping member;
cylindrical projection means extending from said grasping member for engaging said cam; and
a first annular disc, sized to permit passage through said enlarged aperture, disposed about said cylindrical projection means so that said disc is positioned within said housing when said key means engages said cam.

20. A starting interlock system in accordance with claim 19 wherein said first annular disc has a diameter greater than the non-elongation dimension of said elongated slot whereby said key means cannot be removed from said housing when said cam is in said first position.

21. A starting interlock system in accordance with claim 14 wherein said lever further comprises:
a manual operating arm;
first arm means pivotally connected to said manual operating arm for defining said first contact surface; and
second arm means extending from said operating arm for defining said second contact surface.

22. A starting interlock system in accordance with claim 21 further comprising:
spring means connected to said first and second arm means for urging said arms together;
a stop portion on said first arm means; and
stop engaging means on said operating arm for contacting said stop portion to maintain said first and second arm means a predetermined minimum distance apart against the force of said spring means.

* * * * *